No. 857,798. PATENTED JUNE 25, 1907.
M. E. FIDLER & H. LINGENFELTER.
PLANTER.
APPLICATION FILED FEB. 21, 1907.

2 SHEETS—SHEET 1.

WITNESSES:

Meredith E. Fidler
Harley Lingenfelter INVENTORS

By C. A. Snow & Co.
ATTORNEYS

UNITED STATES PATENT OFFICE.

MEREDITH E. FIDLER AND HARLEY LINGENFELTER, OF CANTON, ILLINOIS.

PLANTER.

No. 857,798.  Specification of Letters Patent.  Patented June 25, 1907.

Application filed February 21, 1907. Serial No. 358,673.

*To all whom it may concern:*

Be it known that we, MEREDITH E. FIDLER and HARLEY LINGENFELTER, citizens of the United States, residing at Canton, in the county of Fulton and State of Illinois, have invented a new and useful Planter, of which the following is a specification.

This invention has relation to planters and it consists in the novel construction and arrangement of its parts as hereinafter shown and described.

The object of the invention is to provide a means for actuating the seed dropping mechanism of a planter which means may be so manipulated as to cause the seed to be deposited with accuracy and at such times as to have the seed in alinement longitudinally of the row and laterally with the seed deposits of adjacent rows or what is generally known as check rowed. The said means is operated indirectly by the supporting wheels of the planter and is supplied with clutch mechanisms for throwing the same in and out of gear. The seed boxes of the planter are provided with the usual means for separating the grain from the bulk of seed and with tubes for conveying the seed to the ground.

The present invention includes a vertically movable rod operating adjacent each of the grain tubes and which is forced into contact with the ground at the time that the seed is deposited thereby making a mark upon the soil and indicating the vicinity of the seed in the ground. Consequently, as subsequent rows are planted the operator will so manipulate the means as to cause the said rods to come in contact with the ground in alinement with the marks previously made and by so doing he is assured that the seed will be planted in the ground in alinement in two directions.

Figure 1:
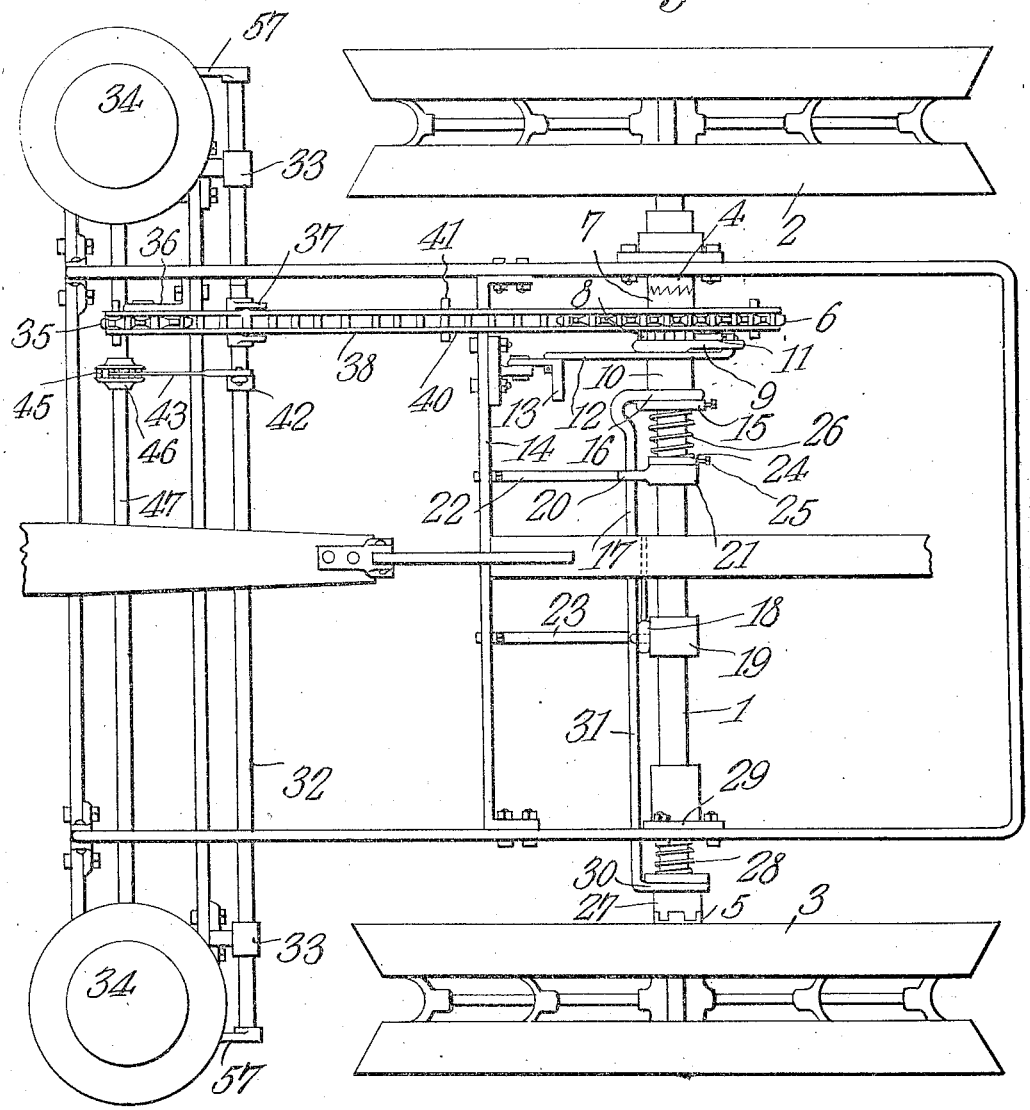
Figure 2:
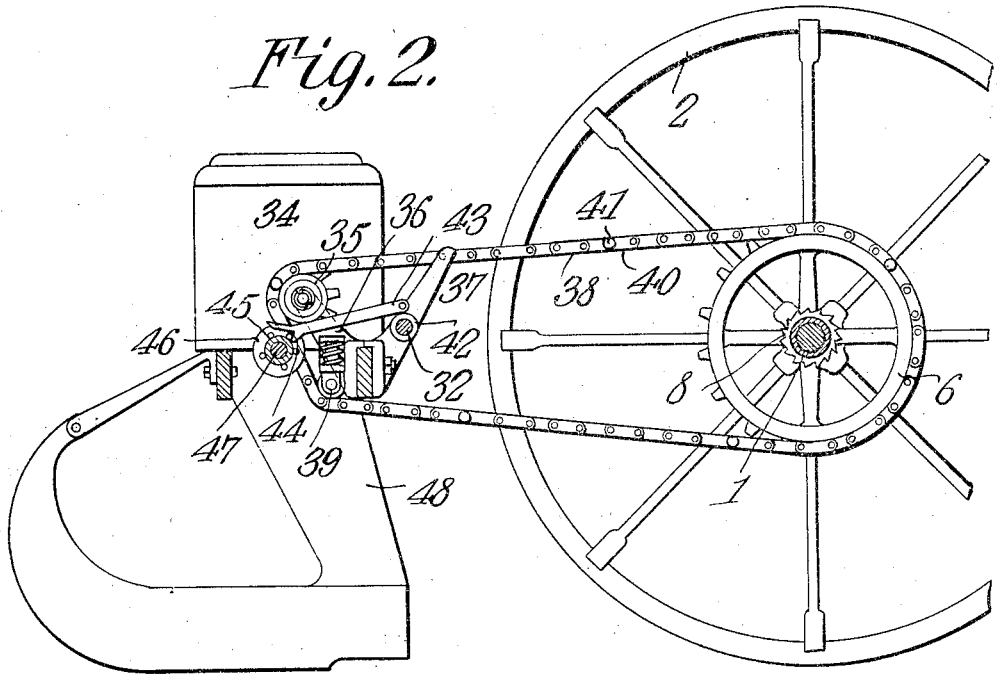
Figure 3:
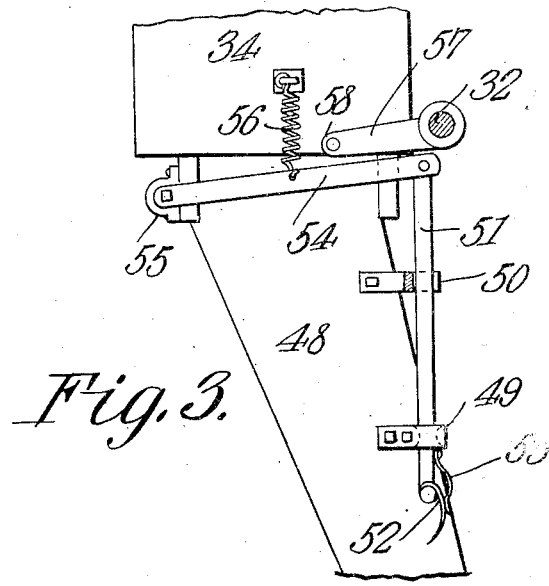

In the accompanying drawing:—Figure 1 is a top plan view of the planter. Fig. 2 is a sectional view of the same, and Fig. 3 is a side elevation of the ground marking device.

The planter consists of the axle 1 to one end of which is fixed a supporting wheel 2 while its opposite end is supported by the wheel 3 which is journaled upon the said axle. The clutch member 4 is mounted upon the axle 1 and rotates with the same, while the clutch member 5 is formed as a continuation of the hub of the wheel 3 and surrounds the axle 1. The sprocket wheel 6 is journaled upon the axle 1 and at one side is provided with a clutch member 7 which is adapted to coöperate with the clutch member 4. Upon its opposite side the sprocket wheel 6 is provided with a ratchet disk 8. The lever 9 is journaled upon the extended hub 10 of the sprocket wheel 6 and is provided with a pawl 11 which engages the ratchets of the disk 8. The link 12 connects said lever 9 with the foot treadle 13 which is pivoted to the frame 14 of the implement. The ring 15 is attached to the end of the hub 10. The band 16 surrounds the hub 10 and operates between the ring 15 and the lever 9. The rod 17 is connected at one end to the collar 16 and at its other end to a lever 18 which is fulcrumed to the side of a bearing 19 surrounding the axle 1. The said rod 17 passes transversely through the lug 20 which extends laterally from the bearing 21 which also receives the axle 1. The bars 22 and 23 connect the bearings 21 and 19 respectively with the frame 14. The collar 24 also surrounds the axle 1 and is provided with a set screw 25 by means of which it may be adjustably secured along the said axle. The coil spring 26 is interposed between the collar 25 and the end of the hub 10 and is under tension to keep the clutch member 7 in engagement with the clutch member 4. The clutch member 27 is feathered upon the axle 1 and is adapted to coöperate with the clutch member 5 of the wheel 3. The coil spring 28 is interposed between the bearing 29 and the clutch member 27 and is under tension to force the said clutch member toward the clutch member 5. The collar 30 receives the clutch member 27 and one end of the rod 31 is connected with the said collar 30 and the other end of the said rod is connected with the lever 18. The shaft 32 is journaled in the bearings 33 which are suitably supported by the front frame of the implement. The said shaft 32 extends transversely of the frame of the implement and is located in the rear of the seed boxes 34. The sprocket wheel 35 is journaled upon the arm 36 which is also supported by the frame of the implement. The U-shaped guide 37 is mounted upon the shaft 32 and the sprocket chain 38 passes around the sprocket wheels 6 and 35 and through the upper portion of the guide 37 and beneath the spring actuated tightener 39 which is also journaled upon the frame of the implement. The said chain 38 is provided at suitable intervals with links 40 which are provided with laterally extending lugs 41. The collar 42 is fixed to the shaft 32 and the pitman 43 is pivoted at one end to the said collar 42 and is provided at its other end with a shoulder 44 which engages the pins 45 between the disks 46. The said disks are mounted upon the shaft 47 which enters the seed boxes 34 and operates the seed separating mechanism located within said boxes (not shown.)

Each of the seed tubes 48 is provided upon its side with an eye 49 and a guide 50. The rod 51 passes vertically through the eye 49 and also through the guide 50. The finger 52 is pivotally mounted upon the lower end of the rod 51 and the spring 53 attached at one end to the rod 51 bears at its other end against the blade 52 and is under tension to hold the said finger projected below the lower end of the said rod in as much as the said finger is pivotally connected with the rod. The bar 54 is pivoted at its rear end to the upper end of the rod 51 and is pivotally supported at its forward end by a bearing 55. One end of the coil spring 56 is attached to the side of the seed box 34 and the other end of the said coil spring is attached to the bar 54 and the said spring is under tension to hold the bar 54 in an elevated position. The cam 57 is fixed to the shaft 32 and the roller 58 is journaled to the end of the said cam and is adapted to engage the upper edge of the bar 54.

The operation of the planter is as follows:— The chain 38 having been previously provided with a suitable number of links 40 arranged at proper intervals and as the implement is drawn over the ground and while clutch members 7 and 4 and 27 and 5 are in engagement the rotary movement of the wheels 2 and 3 is transmitted to the sprocket wheel 6. Said sprocket wheel moves the chain 38 through the guide 37 around the wheel 35 and under the tightening wheel 39. When the lugs 41 come in contact with the upper ends of the guide 37 the said upper end of the guide is moved in the arc of a circle along with the said chain. Thus the shaft 32 is partially rotated and as the collar 42 is carried around the pitman 43 moves longitudinally and the shoulder 44 thereof engages one of the pins 45 between the disks 46 and the shaft 47 is partially rotated. Thus the seed separating mechanism located within the seed boxes 34 and not shown are operated and the seed falls through the tubes 48 and is deposited in the ground. At the same time the cams 57 turn and the rollers 58 thereof bear upon the upper edges of the bars 54. The said bars are forced down against the tension of the springs 56 and the rods 51 are moved down and the blades 52 are forced into the ground at a point adjacent to where the seed is simultaneously deposited. The forward movement of the implement causes the said blades 52 to make a mark in the surface of the soil and if the said fingers should strike a stone or other obstruction they may move back upon their pivots against the tension of the springs 53 and ride over such obstruction. As soon as the lugs 41 pass beyond the upper ends of the guide 37 the tension of the springs 56 moves the bars 54 up which elevates the rods 51 and fingers 52 and turns the cam 57 back into its normal position which in turn partially rotates the shaft 32 and moves the upper end of the guide 37 back and withdraws the pitman 43. Thus it is that the seed is deposited at regular intervals along the rows and each point of deposit is indicated by a mark upon the ground. It will also be observed that the seed marking mechanism will be operated even though one or the other of the supporting wheels 2 or 3 should pass over a hollow in the ground in which case the axle 1 would be turned by the other supporting wheel which would remain in contact with the ground. Again in starting the implement across a field after a number of rows have been planted the operator may by manipulating the treadle 13 swing the lever 9 by means of the rod 12 so that the pawl 11 which engages the ratchet disk 8 may turn the sprocket wheel 6 independently of the axle 1 so that the operation of the marking mechanism may be advanced in order to preserve the transverse alinement in planting the seed without requiring that the implement be unnecessarily moved about the field.

It will thus be seen that a simple and effective means is provided for planting the seed in check row and that the operation is accomplished entirely by the implement without the assistance of cumbersome and expensive wires or other fixtures usually employed to assure regularity in check row planting.

Having described my invention what I claim as new and desire to secure by Letters Patent is:—

1. A planter having a seed dropping mechanism and a ground marking mechanism, a rotatable shaft extending transversely of the planter for operating the dropping mechanism, a reciprocating rotatable shaft for operating the ground marking mechanism, means carried by the last said shaft for operating the first said shaft and means for operating the last said shaft.

2. In a planter, a ground marking mechanism comprising a rod mounted for longitudinal movement, a spring actuated blade attached to the rod and means for moving the rod simultaneously with the seed dropping mechanism.

In testimony that we claim the foregoing as our own, we have hereto affixed our signatures in the presence of two witnesses.

MEREDITH E. FIDLER.
HARLEY LINGENFELTER

Witnesses:
   FREDERIC A. PERKINS,
   BERNARD H. TAYLOR.